July 24, 1951  L. F. BEACH ET AL  2,561,332
COURSE INDICATOR
Original Filed Feb. 20, 1942

INVENTORS:
L. F. BEACH, O. E. ESVAL
& A. W. LANE
BY Herbert V. Thompson
ATTORNEY Patented July 24, 1951

2,561,332

UNITED STATES PATENT OFFICE 2,561,332

COURSE INDICATOR

Lennox F. Beach, Port Washington, Orland E. Esval, Huntington, and Arthur W. Lane, Roosevelt, N. Y., assignors to The Sperry Corporation, a corporation of Delaware Original application February 20, 1942, Serial No. 431,704. Divided and this application March 31, 1945, Serial No. 585,852

12 Claims. (Cl. 116—129)

This invention generally relates to azimuth or course indicators of a character particularly adapted for use with directional gyros either of the free or slaved (gyro-magnetic) type. More particularly, the present invention is directed to the novel subject matter in this connection divided from our copending application Serial No. 431,704, filed February 20, 1942 for Directional Gyroscope, which has now matured into U. S. Patent 2,406,341 issued on August 27, 1946.

The novel features and details of the invention will be apparent from the following description when read in relation with the accompanying drawing, wherein Fig. 1 is a front elevation showing the front of a directional gyro having the improved course or azimuth indicator incorporated therein;

Figure 2:
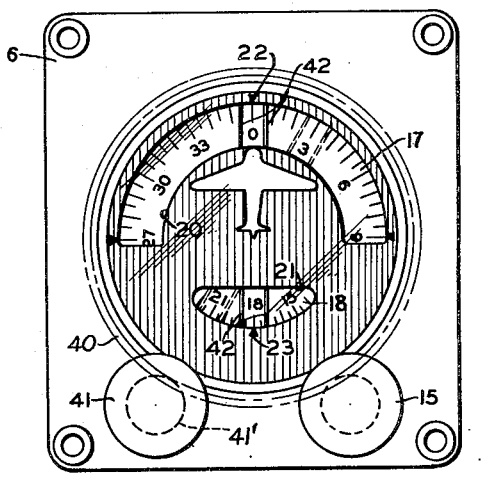
Fig. 2 is an enlarged side elevation of the instrument shown in Fig. 1 with a portion of its housing broken away and with some of the interior parts illustrated in vertical section.
Figure 1:
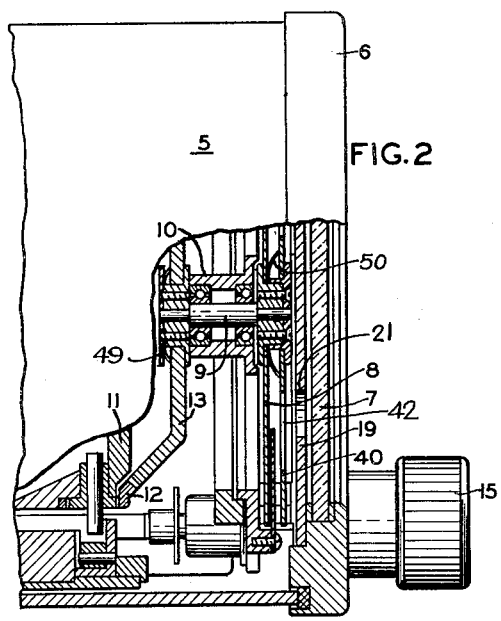

The instrument with which the improved indicator is illustrated in the drawings is a directional gyro of the type that may or may not be slaved to or controlled from a remote magnetic compass. As shown in Figs. 1 and 2, the directional gyro includes a housing 5 having a front wall 6 with a window 7 therein through which the improved indicator is observed. The indicator or improved compass card of the present invention is designated at 8. Card 8 is shown in the drawing as mounted on a shaft 9 that turns in a fixed bushing 10 in the housing 5. The shaft 9 and consequently the card 8 is positioned in the housing 5 by means of the vertical ring 11 of the gyro instrument which drives the same through the bevel gear 12 at the base of the ring and the crown gear 13. Ring 11 of the gyro instrument is suitably mounted to move about a vertical axis within the housing 5, the same supporting a conventional type of gyro rotor case whose rotor is suitably spun about a normally horizontal axis.

Card 8 in the form of the invention shown in Figs. 1 and 2 is illustrated as a flat disc having teeth 14 at its periphery that mesh with a gear positioned by a setting knob 15. A suitable slip friction connection 49 may be employed between the card and shaft 9 to permit the card to be turned relative to the shaft by the knob 15.

Figure 3:
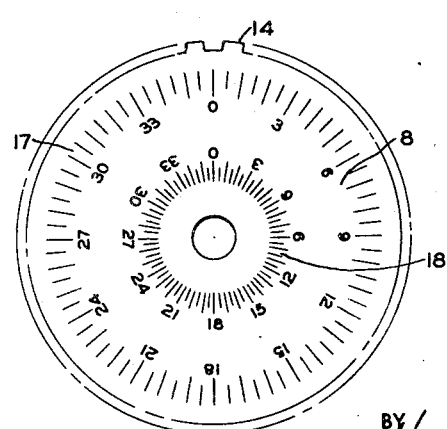
Fig. 3 is a detail view of the preferred form of said indicator forming the subject matter of the present invention.

With reference to Fig. 3, the azimuth indicating card 8 is shown to include two independent sets of concentric scales 17 and 18 calibrated to read in degrees of a circle. The outer scale 17 is of larger radius than the inner scale 18. Mask 19 is fixed in position behind the window 7, the same overlying the card 8 and concealing from view all but a range of each scale having designated calibrations of different values. The cut out at the top of the mask indicated at 20 is circular in form to conceal scale 18 from view while exposing a desired range of values of scale 17. The opening at the lower part of the mask indicated at 21 is smaller than cut-out 20, being closer to the center of the circular card 8. Opening 21 in the mask 19 conceals scale 17 and exposes a desired range of values of scale 18. The mask consequently provides separate openings for exposing portions of the respective scales on the card. Scale 17 is read in connection with lubber line 22. Scale 18 is read in connection with lubber line 23. With this type of card, it will be understood that the scale 17 and lubber line 22 indicate the course or heading of the dirigible craft in which the instrument is employed. Scale 18 and lubber line 23 provide an indication that is the reverse of that indicated by the main scale. Consequently before executing a procedure turn of 180°, the pilot observes the bottom dial of the instrument, i. e., scale 18, to ascertain what the course or heading reading should be on scale 17 when the turn is completed. The craft is then turned until the proper value on scale 17 reaches the lubber line 22 to complete the turn. The calibrations of each of the scales 17 and 18 are readable in an upright and non-inverted position in relation to these respective lubber lines 22 and 23. Mask 19 exposes ranges of the respective scales of the card that are 180° apart. Scales 17 and 18 which extend through a range of from 0° to 360° have corresponding radial designations with adjacent numerals of like values that are inverted relative to one another to appear in a readable position at the respective openings in the mask.

With the azimuth indicator card or compass card 8, there is also employed, in the present instance, a course indicating element 48 mounted to rotate about an axis coaxial with that of said compass card and preferably rotatably mounted on shaft 9. A suitable resilient coupling member 50 is provided to frictionally connect course indicating element 40 with the compass card 8 so that they both normally rotate together but may, when desired, be relatively rotated as shown. The course indicating element 40 comprises a disc having a toothed periphery that may be engaged with a gear 41' connected to a suitable course-indicator setting knob 41. The visible portion of course indicating element 40 comprises an index in the form of the parallel lines 42 indicated in Fig. 1. As stated above, the course indicating element 40 normally rotates with the compass card 8 through the frictional engagement therebetween provided by coupling member 50 to thereby continuously indicate on said card a particular course. When it is desired to indicate a new heading or course, the course indicating element 40 is manually rotated by knob 41 and gear 41' relative to the card 8 until the parallel lines 42 embrace the desired new course calibration. When so actuated the parallel lines of the course indicating element move across both scales 17 and 18 and the openings in the mask. With the craft on the desired new course, say north or 0°, the lines 42 of the course indicating element 40 assume the position indicated in Fig. 1 in which the parallel lines 42 thereof embrace or are on opposite sides of the lubber line 22.

Figure 5:
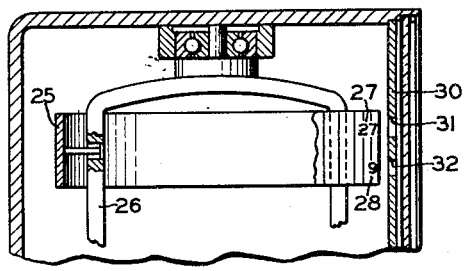
Fig. 5 is a vertical section of the gyro instrument shown in Fig. 4 in which only sufficient of the same is shown to illustrate the form of the modified type of indicator.
Figure 4:
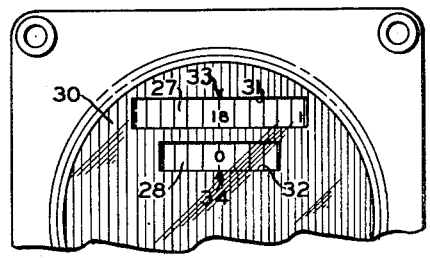
Fig. 4 is a front elevation showing the front of a directional gyro having a modified form of azimuth indicator therein.

In the modification of the invention shown in Figs. 4 and 5, the compass card indicated at 25 is illustrated as directly mounted on the vertical ring 26 of the directional gyroscope. In this instance, the card 25 is ring shaped and includes on its exterior face two circular scales 27 and 28, respectively, whose values are arranged in 180° spaced relation. As shown in Fig. 4, the mask 30 for this type of card includes two rectangular openings 31 and 32 which respectively expose the top and lower scales on the card. The lubber lines for each of the scales in this form of card are indicated at 33 and 34. The top opening 31 in the mask 30 is made larger than opening 32 therein in order to indicate the primary scale of the instrument.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an indicator, a compass card comprising two azimuth indicating scales each calibrated to read in degrees of a circle, a mask fixed in position overlying said scales and arranged to conceal all but a portion of each of said scales having designated values 180° apart respectively, the exposed calibration designations of each scale being readable in an upright position, and a lubber line for each of said scales.

2. In a course indicator, a compass card comprising two azimuth indicating scales each calibrated to read in degrees of a circle, a mask fixed in position overlying said scales and having separate openings therein for the respective scales, said mask and the openings therein being so arranged relative to the scales as to conceal all but a relatively small portion of each of said scales having designated values of a predetermined number of degrees apart, respectively, the calibration designations of each scale being readable in an upright position when in registry with the mask openings, and a lubber line at each of the mask openings.

3. In a course indicator, a compass card comprising two azimuth indicating scales each calibrated to read throughout 360°, a mask fixed in position overlying said scales and having separate openings therein for the respective scales, said mask and the openings therein being so arranged relative to the scales as to conceal all but a relatively small portion of each of said scales having designated values 180° apart, respectively, the calibration designations of each scale being readable in an upright position when in registry with the mask openings, and a lubber line at each of the mask openings.

4. In an indicator, a compass card comprising two azimuth indicating scales each calibrated to read throughout 360°, said scales being rotatable as a unit and means for rotatably supporting them, a mask fixed in position overlying said scales and having openings therein so arranged relative to said scales as to conceal all but a relatively small portion of each of said scales having designated values 180° apart respectively, the calibration designations of each scale being readable in an upright position when in registry with the mask openings, and a lubber line at each of the mask openings.

5. In a course indicator, a disc-like compass card having two circular, azimuth indicating scales thereon each calibrated to read throughout 360°, means for rotatably supporting said card, said scales being concentrically arranged with adjacent calibration designations of the respective scales of like values but inverted with respect to each other, a mask having separate openings therein for concealing all but a relatively small portion of the respective scales, said openings being arranged in 180° spaced relation and relative to the scales so as to expose calibration designations of each scale simultaneously that are readable in an upright position, and a lubber line at each mask opening.

6. In a course indicator, a compass card comprising two azimuth indicating scales each calibrated to read throughout 360°, means for rotatably supporting said card, each of said scales being arranged on the surface of a cylinder to turn together and with the designations of substantially aligned calibrations of the respective scales of values differing by 180°, a mask fixed in position overlying said scales and having separate openings therein for concealing all but a relatively small portion of the respective scales, said openings being arranged to expose substantially aligned calibrations of both scales simultaneously, and a lubber line for each of said scales.

7. In an indicator, a compass card comprising two azimuth indicating scales each calibrated to read in degrees of a circle, a mask fixed in position overlying said scales and arranged to conceal all but a comparatively small portion of each of said scales having designated values 180° apart, respectively, the calibration designations of each scale being readable in an upright position when exposed to view by said mask, said mask exposing one scale to a greater extent than the other whereby to afford a ready distinction therebetween, and a lubber line for each of said scales.

8. In an indicator, a disc-like compass card, means for pivotally supporting said card to rotate in a vertical plane about a normally horizontal axis, said card comprising two scales each calibrated to read in degrees of a circle, a mask arranged to conceal all but a limited portion of each of said scales, the calibrations of one range so exposed having designated values differing a predetermined number of degrees from those of the other exposed portion, each scale being readable in an upright position when so exposed to view, and a lubber line for each of said scales.

9. In a course indicator, a compass card comprising two azimuth indicating scales each calibrated to read in degrees of a circle, a mask arranged in fixed position overlying said scales and having separate openings therein for the respective scales, said mask and the openings therein being so arranged relative to the scales as to conceal all but a relatively small portion of each of said scales having designated values of a predetermined number of degrees apart, respectively, the calibration designations of each scale being readable in an upright position when in registry with the mask openings, a lubber line at each of the mask openings, and a course setting element frictionally engaged with the card.

10. In an indicator, the combination with a compass card having a circular series of scale graduations and two concentric, circular series of direction-indicating numerals associated therewith, each series covering the range of from 0° to 360°, radially corresponding and adjacent numerals of the respective scales being of like values but inverted with respect to each other, of a mask having separate openings therein for concealing all but a relatively small portion of the respective series of numerals, said openings being arranged in 180° spaced relation and relative to the scales so as to simultaneously expose numerals of both series when in upright and non-inverted relation, and a lubber line at each mask opening.

11. In an indicator, a compass card comprising two azimuth indicating scales each calibrated to read in degrees of a circle, a mask fixed in position overlying said scales and arranged to conceal all but a portion of each of said scales having designated values 180° apart respectively, the exposed calibration designations of each scale being readable in an upright position, a lubber line for each of said scales, a course indicating element movable over and readable on both the scales of said compass card, a resilient coupling member frictionally connecting said element and said card whereby said element is movable with said card but may be movable relative thereto, and manually operable means for positioning said element relative to said card whereby said element may be manually reset at will to indicate any desired course on both scales without disturbing the position of the compass card.

12. In an indicator, the combination with a directional gyro, a compass card comprising two azimuth indicating scales calibrated to read in degrees of a circle, each of said scales having designated values 180° apart and each being readable in an upright position, a course indicating element mounted to rotate about said axis and movable over and readable on both scales on said compass card, a resilient coupling member frictionally connecting said element and said card whereby said element will rotate with said card but may be rotated relative thereto, and manually operable means for rotating said element relative to said card whereby said element may be manually reset at will to indicate any desired course while the relation of the gyro to the compass card remains undisturbed.

LENNOX F. BEACH.
ORLAND E. ESVAL.
ARTHUR W. LANE.

REFERENCES CITED

The following references are of record in the file of this patent:

UNITED STATES PATENTS

| Number | Name | Date |
| --- | --- | --- |
| 1,258,031 | MacGahan | Mar. 5, 1918 |
| 1,422,576 | Humphreys | July 11, 1922 |
| 1,743,294 | Tracy | Jan. 14, 1930 |
| 1,974,220 | Sperry, Jr. | Sept. 18, 1934 |
| 2,112,516 | Browne | Mar. 29, 1938 |
| 2,127,807 | Carbonara | Aug. 23, 1938 |
| 2,158,468 | McCleary | May 16, 1939 |
| 2,334,116 | Meredith | Nov. 9, 1943 |
| 2,335,876 | Olshwsky | Dec. 7, 1943 |
| 2,383,468 | Cocks | Aug. 28, 1945 |

FOREIGN PATENTS

| Number | Country | Date |
| --- | --- | --- |
| 288,412 | Great Britain | Apr. 12, 1928 |
| 305,438 | Germany | May 7, 1918 |
| 365,242 | Germany | Dec. 12, 1922 |